(12) United States Patent
Chan et al.

(10) Patent No.: US 8,130,489 B2
(45) Date of Patent: Mar. 6, 2012

(54) EXPANSION CARD MODULE

(75) Inventors: Chun-Kai Chan, Taipei (TW); Shin-Pin Lo, Taipei (TW); Li-Hsiang Liao, Taipei (TW); Chun-Hsia Chang, Taipei (TW)

(73) Assignee: ASUTeK Computer Inc., Taipei (TW)

( * ) Notice: Subject to any disclaimer, the term of this patent is extended or adjusted under 35 U.S.C. 154(b) by 503 days.

(21) Appl. No.: 12/346,898

(22) Filed: Dec. 31, 2008

(65) Prior Publication Data

US 2009/0174997 A1   Jul. 9, 2009

(30) Foreign Application Priority Data

Jan. 9, 2008   (TW) .............................. 97100864 A

(51) Int. Cl.
  *G06F 1/16*   (2006.01)
  *H05K 1/14*   (2006.01)
  *H05K 7/00*   (2006.01)
  *H05K 5/00*   (2006.01)
  *H05K 7/14*   (2006.01)
  *H05K 7/16*   (2006.01)

(52) U.S. Cl. .............. 361/679.32; 361/679.31; 361/740; 361/747; 361/759; 361/801; 361/727

(58) Field of Classification Search ............ 361/679.31, 361/679.32, 726, 732, 740–741, 747, 759, 361/756, 801–803, 727, 686

See application file for complete search history.

(56) References Cited

U.S. PATENT DOCUMENTS

| 6,625,041 | B1 * | 9/2003 | Chen ............................. 361/829 |
| 6,856,518 | B2 * | 2/2005 | Dobbs et al. .................. 361/801 |
| 7,151,677 | B2 * | 12/2006 | Le et al. ........................ 361/807 |
| 2003/0053303 | A1 * | 3/2003 | Lai ................................ 361/800 |
| 2005/0093119 | A1 | 5/2005 | Chen et al. |
| 2007/0105425 | A1 * | 5/2007 | Wang ............................ 439/326 |
| 2007/0202732 | A1 * | 8/2007 | Yahiro et al. ................. 439/326 |

FOREIGN PATENT DOCUMENTS

| CN | 1491809 | 4/2004 |
| CN | 1882948 | 12/2006 |
| CN | 101030679 | 9/2007 |
| TW | 568513 | 12/2003 |

OTHER PUBLICATIONS

"Office Action of Taiwan Counterpart Application", issued on Jan. 11, 2011, p. 1-p. 5, in which the listed reference.
"1st Office Action of China counterpart application", issued on Mar. 29, 2010, p. 1-p. 6.

\* cited by examiner

*Primary Examiner* — Jayprakash N Gandri
*Assistant Examiner* — Nidhi Desai
(74) *Attorney, Agent, or Firm* — Jianq Chyun IP Office

(57) ABSTRACT

An expansion card module is provided. The expansion card module is adapted for being assembled to a circuit board. The circuit board includes a connector and a fixing unit. The expansion card module is fixed between the connector and the fixing unit. The expansion card module includes an expansion card and a shielding plate. The expansion card has an end plugged in and electrically connected to the connector. The shielding plate includes a first portion and a second portion. The first portion covers a part of the expansion card. The second portion extends to an outside of the other end of the expansion card, and is fixed by the fixing unit.

6 Claims, 2 Drawing Sheets

EXPANSION CARD MODULE

CROSS-REFERENCE TO RELATED APPLICATION

This application claims the priority benefit of Taiwan application serial no. 97100864, filed on Jan. 9, 2008. The entirety of the above-mentioned patent application is hereby incorporated by reference herein and made a part of this specification.

BACKGROUND OF THE INVENTION

1. Field of the Invention

The present invention generally relates to an expansion card module, and more particularly, to an expansion card module adapted for being assembled to a board.

2. Description of Related Art

Generally, a computer host is often equipped with boards required for executing fundamental functions. In addition, a user may further provide additional boards as desired for achieving improved utility of the computer host. For example, in case the computer host does not have a built-in wireless network card or a built-in TV card, the user may select to additionally install a wireless network card or a TV card to the computer host, for accessing a wireless network or viewing TV programs.

Further, the board, e.g., the wireless network card or the TV card, may be provided with an expansion card. The board includes a connector and a fixing unit, while the expansion card is fixed between the connector and the fixing unit. Specifically, when the expansion card is plugged in the connector, it can be stably secured to the connecter with the facilitation of the fixing unit. It should be noted that expansion cards are often categorized into two kinds, i.e., full-size expansion card and half-size expansion card. Accordingly, slots and fixing units of boards are also correspondingly and adaptively arranged, for effectively fixing the full-size expansion card and the half-size expansion card thereto.

SUMMARY OF THE INVENTION

Accordingly, the present invention is directed to provide an expansion card module. The expansion card module includes a half-size expansion card, and is adapted for being fixed to a board which is preliminarily adapted for matching with a full-size expansion card.

The present invention provides an expansion card module, adapted for being assembled to a circuit board. The circuit board includes a connector and a fixing unit. The expansion card module is fixed between the connector and the fixing unit. The expansion card module includes an expansion card and a shielding plate. The expansion card has an end plugged in and electrically connected to the connector. The shielding plate includes a first portion and a second portion. The first portion covers the expansion card. The second portion extends to an outside of another end of the expansion card, and is fixed by the fixing unit.

According to an embodiment of the present invention, the fixing unit includes two positioning protrusion poles. The second portion is configured with two positioning holes corresponding to the two positioning protrusion poles. The positioning protrusion poles are adapted for correspondingly engaging with the positioning holes. According to an embodiment of the present invention, the fixing unit includes two holding spring pieces clamping on the second portion. In other embodiments of the present invention, the fixing unit can be a plurality of screw bolts and screw nuts.

According to an embodiment of the present invention, the circuit board is a wireless network card, or a TV card. According to a preferred embodiment of the present invention, in order to achieve an optimal shielding performance, the shielding plate is a metal plate. Further, according to a preferred embodiment of the present invention, a space between the connector and the fixing unit is unequal to a length of the expansion card. More preferably, the expansion card is a half-size expansion card.

The present invention utilizes the shielding plate for increasing the entire length of the expansion card, so that the expansion card is adapted for being fixed to a board adapted for matching with a full-size expansion card.

Applying with the foregoing advantage of the present invention, the system assembly is not necessarily required to be specifically designed for matching with boards of expansion cards of different sizes. As such, the complexity and annoyance of stock and spare parts management can be reduced. In other words, if only the system assembly is adapted for boards of one size, it can then be used for assembling a full-size expansion card and a half-size expansion card. Further, when the user does not want to use the half-size expansion card secured in the expansion card module, he can directly remove the entirety of the expansion card module, and alternatively replace with a full-size expansion card. In such a way, the user can use the original board, thus sufficiently exerting the utilization of the system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
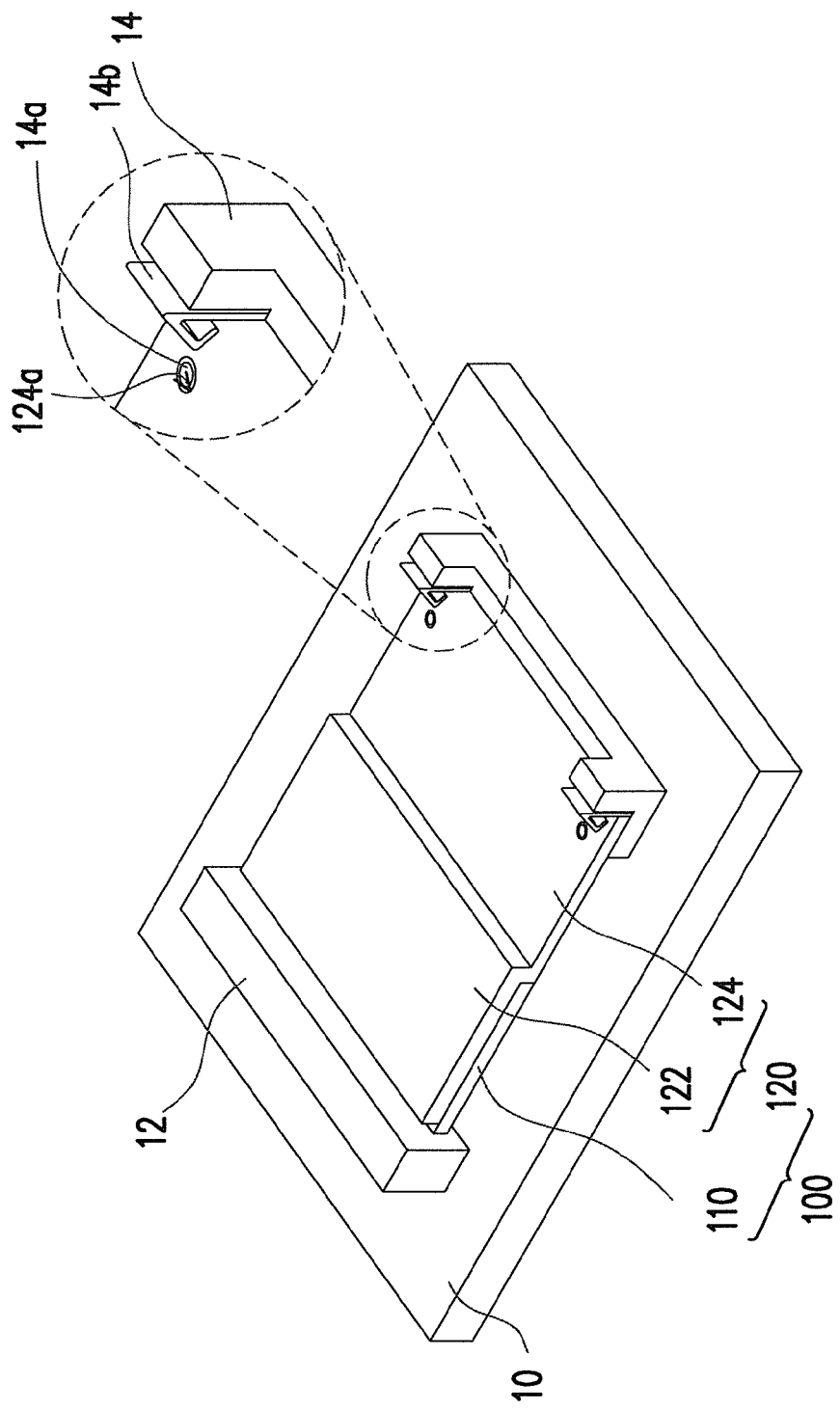
FIG. 1A is an isometric view of a circuit board and of an expansion card module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
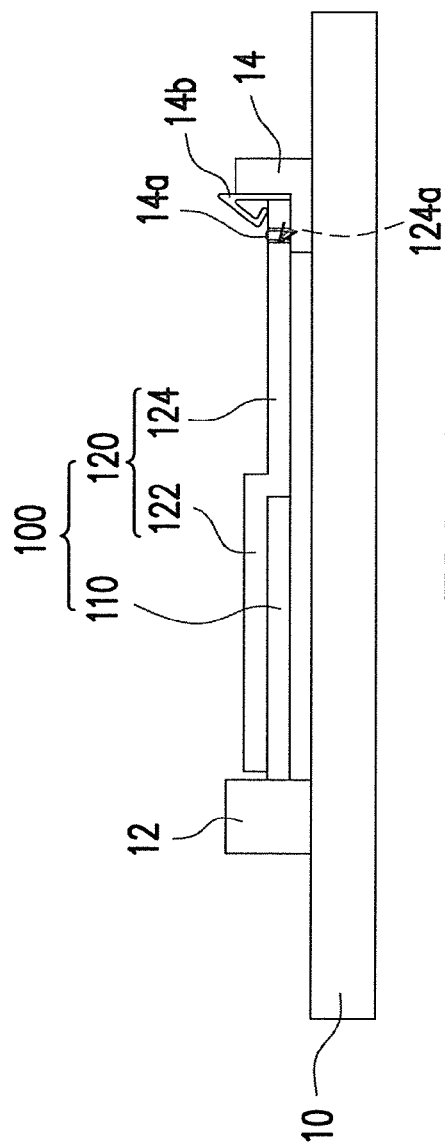
FIG. 1B is a cross-sectional view of the circuit board and the expansion card module shown in FIG. 1A.
Figure 1C:
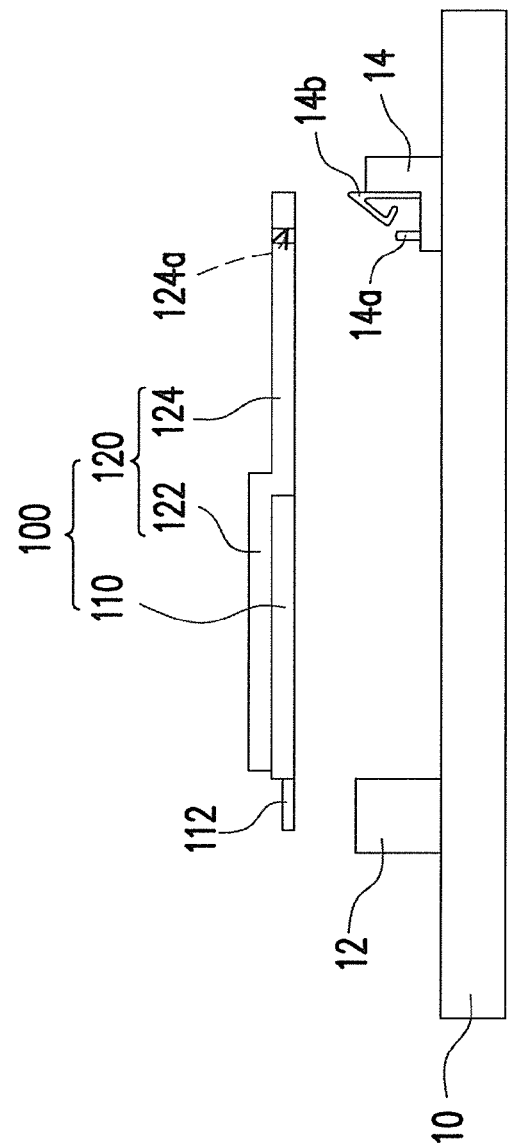
FIG. 1C is an exploded view of the circuit board and the expansion card module shown in FIG. 1B.

FIG. 1A is an isometric view of a circuit board and of an expansion card module according to an embodiment of the present invention. FIG. 1B is a cross-sectional view of the circuit board and the expansion card module shown in FIG. 1A. FIG. 1C is an exploded view of the circuit board and the expansion card module shown in FIG. 1B. Referring to FIGS. 1A, 1B, and 1C together, the present invention provides an expansion card module 100. The expansion card module 100 is adapted to be assembled to a circuit board 10. The circuit board for example is a wireless network card or a TV card. The circuit board 10 includes a connector 12 and a fixing unit 14. The expansion card module 100 is fixed between the connector 12 and the fixing unit 14. The expansion card is electrically connected to the connector 12.

In the current embodiment, the expansion card module 100 essentially includes an expansion card 110 and a shielding plate 120. The expansion card 110 for example is a half-size expansion card, which is also known as a mini card. The expansion card 110 further includes a plurality of electronic components contained therein (not shown in the drawings). Further, one end of the expansion card 110 is provided with an electrical connecting portion 112. The electrical connecting portion 112 is adapted for being plugged into the connector 12 of the circuit board 10. Therefore, the electronic components of the expansion card 110 can be electrically connected to electronic components or conductive wires (not shown in the drawings) of the circuit board 10 via the electrical connection between the electrical connecting portion 112 and the connector 12. Further, the shielding plate 120 is assembled on the expansion card 110. The shielding plate 120 covers electronic components distributed at a surface of the expansion card 110. Preferably, the shielding plate 120 is a metal plate for effectively avoiding an electromagnetic interference (EMI) to the electronic components or conductive wires of the expansion card 110 caused by other electronic components.

Specifically, the shielding plate 120 is composed of a first portion 122 and a second portion 124. The first portion 122 covers the expansion card 110. The second portion 124 extends to an outside of another end of the expansion card 110, and is fixed to the fixing unit 14. In the current embodiment, the expansion card 110 is a half-size expansion card, and the expansion card assembly of the circuit board 10 is specified for accommodating a full-size expansion card (i.e., the space between the connector 12 and the fixing unit 14 is equal to a length of a full-size expansion card rather than a length of a half-size expansion card). As such, a size of the entirety of the combination of the expansion card 110 of the current embodiment and the shielding plate 120 is equal to the length of a full-size expansion card. In other words, the expansion card module 100 of the current embodiment is adapted for effectively securing the half-size expansion card between the connector 12 which is provided for matching with a full-size expansion card, and the fixing unit 14. The fixing unit 14 fixing the expansion card module 100 is to be discussed in more details herebelow.

In the current embodiment, the fixing unit 14 for example is a fixing base having two positioning protrusion poles 14a. The second portion 124 of the shielding plate 120 is configured with two positioning holes 124a corresponding to the two positioning protrusion poles 14a, respectively. In such a way, the expansion card module 100 can be accurately positioned to the fixing base by matching the positioning protrusion poles 14a with the positioning holes 124a. Further, in order to more stably secure the expansion card module 100 between the connector 12 and the fixing base, the fixing base can be further provided with two holding spring pieces 14b. When the expansion card module 100 is assembled between the connector 12 and the fixing base, the holding spring pieces 14b apply a clamping force to the second portion 124 of the shielding plate 120 for securing the shielding plate 120 to the fixing base. In such a way, the expansion card module can be more stably fixed between the connector 12 and the fixing base.

In other embodiments of the present invention, the fixing unit 14 can also be a plurality of screw bolts and nuts. In this case, the shielding plate 120 can be fixed to the fixing unit 14 by an engagement between the screw bolts and the screw nuts. More specifically, the present invention does not restrict the method of fixing unit 14 for fixing the expansion card module 100. Any fixing unit 14 adapted for stably fixing the expansion card module 100 to the connector 12 should be construed as within the scope of the present invention.

Furthermore, in order to provide a better heat dissipation to the electronic components of the expansion card 110, the first portion 122 of the shielding plate 120 can be configured with a plurality of heat dissipation holes (not shown in the drawings). The heat dissipation holes are adapted for providing a heat dissipation to the electronic components covered by the first portion 122. Meanwhile, in addition to the configuration of the heat dissipation holes for improving the heat dissipation performance of the electronic components, the electronic components of the expansion card 110 can also be provided with a heat sink (not shown in the drawings) for facilitating the heat dissipation of the electronic components. In addition to facilitating the heat dissipation of the electronic components, the heat sink is also adapted for facilitating to avoid the electronic components from being affected by EMI.

In summary, the present invention provides an expansion card module including an expansion card and a shielding plate. The present invention elongates the entire length of the expansion card module by extending the length of the shielding plate. In such a way, a half-size expansion card can be combined with the shielding plate, and thus can be plugged to a board which is adapted for matching with a full-size expanding card. In other words, the board which is adapted for matching with a full-size expanding card can directly match with a full-size expanding card, and can also match with a half-size expanding card in accordance with the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An expansion card module, adapted for being assembled to a circuit board, the circuit board comprising a connector and a fixing unit, the expansion card module being fixed between the connector and the fixing unit, the expansion card module comprising: an expansion card, having one end plugged in and electrically connected to the connector; and a shielding plate comprising a first portion and a second portion, wherein the first portion covers the expansion card, while the second portion extends to an outside of another end of the expansion card and is fixed to the circuit board by the fixing unit and a size of the entirety of the combination of the lengths of the expansion card and the shielding plate is corresponding to the length of a full-size expansion card; wherein the fixing unit comprises two holding spring pieces to clamp the second portion of the shielding plate; and wherein the expansion card is a half-size expansion card.

2. The expansion card module according to claim 1, wherein the fixing unit comprises two positioning protrusion poles, the second portion is configured with two positioning holes, and the positioning protrusion poles are adapted for correspondingly engaging with the positioning holes, respectively.

3. The expansion card module according to claim 1, wherein the fixing unit comprises screw bolts and screw nuts.

4. The expansion card module according to claim 1, wherein the circuit board is a wireless network card, or a TV card.

5. The expansion card module according to claim 1, wherein the shielding plate is a metal plate.

6. The expansion card module according to claim 1, wherein a space between the connector and the fixing unit is unequal to a length of the expansion card.

* * * * *